(12) United States Patent
Zhao et al.

(10) Patent No.: US 12,223,284 B2
(45) Date of Patent: Feb. 11, 2025

(54) VISUAL DIALOGUE METHOD AND SYSTEM

(71) Applicant: Sichuan Institute of Artificial Intelligence, Yibin, Sichuan, China, Yibin (CN)

(72) Inventors: Lei Zhao, Yibin (CN); Junlin Li, Yibin (CN); Jie Shao, Yibin (CN); Lianli Gao, Yibin (CN); Jingkuan Song, Yibin (CN)

(73) Assignee: Sichuan Institute of Artificial Intelligence, Yibin, Sichuan, China, Yibin (CN)

( * ) Notice: Subject to any disclaimer, the term of this patent is extended or adjusted under 35 U.S.C. 154(b) by 243 days.

(21) Appl. No.: 17/974,568

(22) Filed: Oct. 27, 2022

(65) Prior Publication Data

US 2024/0086643 A1 Mar. 14, 2024

(30) Foreign Application Priority Data

Sep. 13, 2022 (CN) .......................... 202211110308.2

(51) Int. Cl.
*G06F 40/35* (2020.01)
*G06V 10/80* (2022.01)
*G06V 10/82* (2022.01)

(52) U.S. Cl.
CPC ............ *G06F 40/35* (2020.01); *G06V 10/811* (2022.01); *G06V 10/82* (2022.01)

(58) Field of Classification Search
CPC ........ G06F 40/35; G06V 10/82; G06V 10/811
See application file for complete search history.

(56) References Cited

U.S. PATENT DOCUMENTS 10,839,223 B1 * 11/2020 Jiang ...................... G06V 20/46
11,822,544 B1 * 11/2023 Carvalho ............... G06N 20/00
(Continued)

FOREIGN PATENT DOCUMENTS

| CN | 110609891 A | 12/2019 |
|---|---|---|
| CN | 110647612 A | 1/2020 |

(Continued)

OTHER PUBLICATIONS

Yan Ruyu, et al., Visual question answering model based on bottom-up attention and memory network, Journal of Image and Graphics, 2020, pp. 993-1006, vol. 25 No.5.

(Continued)

*Primary Examiner* — Kevin Ky
(74) *Attorney, Agent, or Firm* — Bayramoglu Law Offices LLC

(57) ABSTRACT

A visual dialogue method and system is provided. The method includes obtaining original input data, where the original input data includes current image data and a new question, and the new question is related to the current image data; preprocessing text data and image data in the original input data to obtain a text feature sequence and a visual feature sequence, respectively; using a VisDial dataset to construct a text corpus; obtaining text sequence knowledge by using a potential knowledge searcher based on the visual feature sequence and the text corpus; constructing a sparse scene graph based on the visual feature sequence; performing data fusion on the text feature sequence, the visual feature sequence, the text sequence knowledge, and the sparse scene graph to obtain a data fusion result; and obtaining dialogue content of the new question by using a decoder based on the data fusion result.

4 Claims, 2 Drawing Sheets

(56) References Cited

U.S. PATENT DOCUMENTS

| | | |
|---|---|---|
| 12,046,067 B2* | 7/2024 | Muffat ................. G06V 30/293 |
| 2021/0012222 A1* | 1/2021 | Kim ........................ G06F 40/30 |
| 2021/0081503 A1* | 3/2021 | Tran ......................... G06N 3/08 |
| 2021/0117459 A1* | 4/2021 | Tan .................. G06F 18/24147 |
| 2021/0216577 A1* | 7/2021 | Xiao ................... G06F 16/3329 |
| 2021/0232773 A1 | 7/2021 | Wang et al. |
| 2021/0248376 A1* | 8/2021 | Zhao ...................... G06V 20/49 |
| 2022/0237403 A1 | 7/2022 | Zhou et al. |
| 2023/0022845 A1* | 1/2023 | Meng ................... G06F 40/279 |
| 2023/0038573 A1* | 2/2023 | Patel ..................... H04L 63/102 |
| 2023/0153531 A1* | 5/2023 | Geng ..................... G06N 3/084 |
| | | 704/9 |
| 2023/0401243 A1* | 12/2023 | Sun ........................ G06N 3/044 |

FOREIGN PATENT DOCUMENTS

| | | |
|---|---|---|
| CN | 112905754 A | 6/2021 |
| KR | 20210056071 A | 5/2021 |

OTHER PUBLICATIONS

Zhao Lei, et al., Adaptive Visual Memory Network for Visual Dialog, Journal of University of Electronic Science and Technology of China, 2021, pp. 749-753, vol. 50 No.5.

* cited by examiner

VISUAL DIALOGUE METHOD AND SYSTEM

CROSS REFERENCE OF THE RELATED APPLICATION

The present invention is based on and claims foreign priority to Chinese patent application No. 202211110308.2 filed Sep. 13, 2022, the entire content of which is incorporated herein by reference.

TECHNICAL FIELD

The present disclosure relates to the technical field of visual dialogues, specifically, a visual dialogue method and system.

BACKGROUND

With the rapid development of a deep neural network (DNN), the integration of visual languages has also received more attention, such as image/video caption generation and visual question answering. A visual dialogue is an extension of visual question answering. Different from visual question answering which includes only a single round of question answering and lacks consistent and continuous interaction, the visual dialogue mainly researches a plurality of rounds of continuous question answering. The visual dialogue aims to make an accurate answer based on an input image, an input question, and a previous dialogue history. Visual dialogue can be used in many fields, such as AI-based blind assistance, robots, and voice assistants.

Visual and text content needs to be understood comprehensively and deeply to answer a current question accurately. A basic solution is to use an encoder to extract global features of an image, a question, and a historical dialogue, and then fuse these features into a joint representation to infer a final answer. However, this operation may lead to information redundancy and cannot avoid visual co-reference resolution. After that, researchers proposed many visual dialogue methods based on an attention mechanism or a graph model to mine necessary visual content and avoid co-reference. However, these methods almost focus only on the internal interaction of various inputs and are powerless to deal with a complex scene. The following mainly exists in the complex scene: 1) a lot of complex interactions between foreground objects and 2) a noisy background that may interfere with the foreground and confuse visual reasoning. Although some knowledge-based methods have been proposed later, they are all based on single knowledge and are limited in the improvement of a reasoning capability. In addition, they are also less effective in parsing long and difficult sentences.

SUMMARY

The present disclosure is intended to provide a visual dialogue method and system to parse long or complex questions and corresponding answers and to handle visual scenes with complex interactions between entities to achieve a more accurate dialogue.

In order to resolve the above technical problem, the present disclosure adopts the following technical solutions:

The present disclosure provides a visual dialogue method, including:
obtaining original input data, where the original input data includes current image data and a new question, and the new question is related to the current image data;
preprocessing text data and image data in the original input data to obtain a text feature sequence and a visual feature sequence respectively;
using a VisDial dataset to construct a text corpus;
obtaining text sequence knowledge by using a potential knowledge searcher based on the visual feature sequence and the text corpus;
constructing a sparse scene graph based on the visual feature sequence;
performing data fusion on the text feature sequence, the visual feature sequence, the text sequence knowledge, and the sparse scene graph to obtain a data fusion result; and
obtaining dialogue content of the new question by using a decoder based on the data fusion result.

Optionally, the preprocessing text data and image data in the original input data to obtain a text feature sequence and a visual feature sequence respectively includes:
encoding the text data by using a word embedding method and a bidirectional long-short memory (Bi-LSTM) network to obtain the text feature sequence; and
encoding the image data by using a faster region-based convolutional neural network (R-CNN) to obtain the visual feature sequence.

Optionally, the potential knowledge searcher includes an aggregation operation unit, a Bi-LSTM unit, and a similarity calculation unit. The aggregation operation unit is configured to obtain the visual feature sequence. The Bi-LSTM unit is configured to obtain text data in the text corpus, and the similarity calculation unit is configured to calculate the similarity between the text data and the visual data to obtain the text sequence knowledge.

Optionally, the performing data fusion on the text feature sequence, the visual feature sequence, the text sequence knowledge, and the sparse scene graph to obtain a data fusion result includes:
obtaining a first attention result by using a question-guided first attention module based on the text feature sequence and the new question;
obtaining a second attention result by using a question-guided second attention module based on the text sequence knowledge;
cascading the first attention result and the second attention result to obtain a cascading result;
obtaining a third attention result by using a knowledge-guided attention module based on the visual feature sequence and the second attention result;
performing graph convolution on the sparse scene graph to obtain a graph convolution result; and
obtaining the data fusion result by using an attention-based fusion module based on the cascading result, the third attention result, and the graph convolution result.

Optionally, the obtaining a first attention result by using a question-guided first attention module based on the text feature sequence and the new question includes:
performing sentence-level attention guidance on the text feature sequence by using the new question to obtain an attention feature,
filtering the attention feature by using a sigmoid activation function to obtain a sentence-level sequential representation of potential knowledge,
obtaining a word-level sequential representation of the potential knowledge by calculating a dot-product of an attention feature and the sigmoid activation function based on a word-level question feature of the new question, and obtaining the first attention result based on the attention feature and the word-level sequential representation of the potential knowledge.

Optionally, the performing sentence-level attention guidance on the text feature sequence by using the new question to obtain an attention feature is implemented in the following manner:

$$\tilde{s}^z = \sum_{r=1}^{10} \alpha_r^z z_r$$

where $\tilde{s}^z$ represents the attention feature, $\alpha_r^z$ represents a weight coefficient, and $\alpha_r^z$=soft max $(W_1(f_q^z(q_r) \circ f_p^z(z_r)) + b_1)$; $z_r$ represents a sentence feature of an $r^{th}$ round of dialogue; $W_1$ and $b_1$ represent a first learnable parameter and an offset, respectively; $f_q^z$ and $f_p^z$ represent nonlinear transformation layers; $\circ$ represents an element-wise multiplication operation; $q_r$ represents a sentence-level question feature; and r represents a quantity of rounds of dialogue.

The step of filtering the attention feature by using a sigmoid activation function is implemented in the following manner:

$$\tilde{Z} = \text{gate}^z \circ [q_r, \tilde{s}^z]$$

where $\tilde{Z}$ represents the sentence-level sequential representation of the potential knowledge; $\text{gate}^z$ represents a gating function, and $\text{gate}^z = \sigma(W_2[q_r, \tilde{s}^z] + b_2)$; $\sigma$ represents the sigmoid activation function; $W_2$ represents a second learnable parameter; $b_2$ represents a second offset; $q_r$ represents the sentence-level question feature; and $\tilde{s}^z$ represents the attention feature.

Optionally, the step of obtaining a word-level sequential representation of the potential knowledge by calculating a dot-product of an attention feature and the sigmoid activation function based on a word-level question feature of the new question is implemented in the following manner:

$$e^w = \text{gate}^z \circ [u^q, \tilde{w}^z]$$

where $e^w$ represents the word-level sequential representation of the potential knowledge; $u^q$ represents the word-level question feature; $\tilde{w}^z$ represents a word-level attention feature, and $$\tilde{w}^z = \sum_{r=1}^{10} \sum_{j=1}^{n_z} \alpha_{r,j}^w w_{r,j}^z; \alpha_{r,j}^w$$

represents an attention weight coefficient, and $$\alpha_{r,j}^w = \exp(t_{r,j}^w) / \sum_{j=1}^{n_z} \exp(t_{r,j}^w),$$

where $t_{r,j}^w = f_q^w(u^q)^T f_p^w(u_{r,j}^Z)$; $f_q^w$ and $f_p^w$ represent nonlinear transformation layers; T represents a matrix transpose operation; $u_{r,j}^Z$ represents a word-level feature of the text sequence knowledge; $w_{r,j}^Z$ represents a word embedding feature of the text feature sequence; j represents a word scalar; and r represents a quantity of rounds of dialogue.

The present disclosure further provides a visual dialogue system, including:
a data obtaining module configured to obtain original input data;
a word embedding and Bi-LSTM network configured to encode text data in the original input data to obtain a text feature sequence;
a faster RCNN module configured to encode image data in the original input data to obtain a visual feature sequence;
a corpus construction module configured to construct a text corpus based on a VisDial dataset;
a potential knowledge searcher configured to obtain text sequence knowledge based on the visual feature sequence and the text corpus;
a scene graph generator configured to construct a sparse scene graph based on the visual feature sequence;
a data fusion subsystem configured to perform data fusion on the text feature sequence, the visual feature sequence, the text sequence knowledge, and the sparse scene graph to obtain a data fusion result; and
a decoder configured to obtain dialogue content of a new question based on the data fusion result.

Optionally, the data fusion subsystem includes:
a question-guided first attention module configured to obtain a first attention result based on the text feature sequence and the new question;
a question-guided second attention module configured to obtain a second attention result based on the text sequence knowledge;
a cascading module configured to cascade the first attention result and the second attention result to obtain a cascading result;
a knowledge-guided attention module configured to obtain a third attention result based on the visual feature sequence and the second attention result;
a graph convolution module configured to perform graph convolution on the sparse scene graph to obtain a graph convolution result; and
an attention-based fusion module configured to obtain the data fusion result based on the cascading result, the third attention result, and the graph convolution result.

Optionally, the potential knowledge searcher includes an aggregation operation unit, a Bi-LSTM unit, and a similarity calculation unit. The aggregation operation unit is configured to obtain the visual feature sequence. The Bi-LSTM unit is configured to obtain text data in the text corpus, and the similarity calculation unit is configured to calculate the similarity between the text data and the visual data to obtain the text sequence knowledge.

The present disclosure has the following beneficial effects.

1. The potential knowledge searcher provided in the present disclosure mainly calculates the similarity between a sentence-level feature and an image feature of a current question to sort sentences in the corpus in descending order to retrieve Top-K sentences related to an image as text sequence knowledge, which can enhance parsing of long or complex questions and corresponding answers.
2. A question-guided attention mechanism provided in the present disclosure performs attention calculation on a dialogue history and the text sequence knowledge separately to filter out redundant information irrelevant to the current question.
3. The dialogue history and the text sequence knowledge after attention calculation are cascaded, which can alleviate a pronoun reference problem in this task.
4. The sparse scene graph can provide more complete visual knowledge for scene understanding.

5. The present disclosure can parse the long or complex questions and the corresponding answers and handle visual scenes with complex interactions between entities to achieve a more accurate dialogue.

DETAILED DESCRIPTION OF THE EMBODIMENTS

The principles and features of the present disclosure are described below with reference to the accompanying drawings. The listed embodiments are only used to explain the present disclosure, rather than to limit the scope of the present disclosure.

Figure 1:
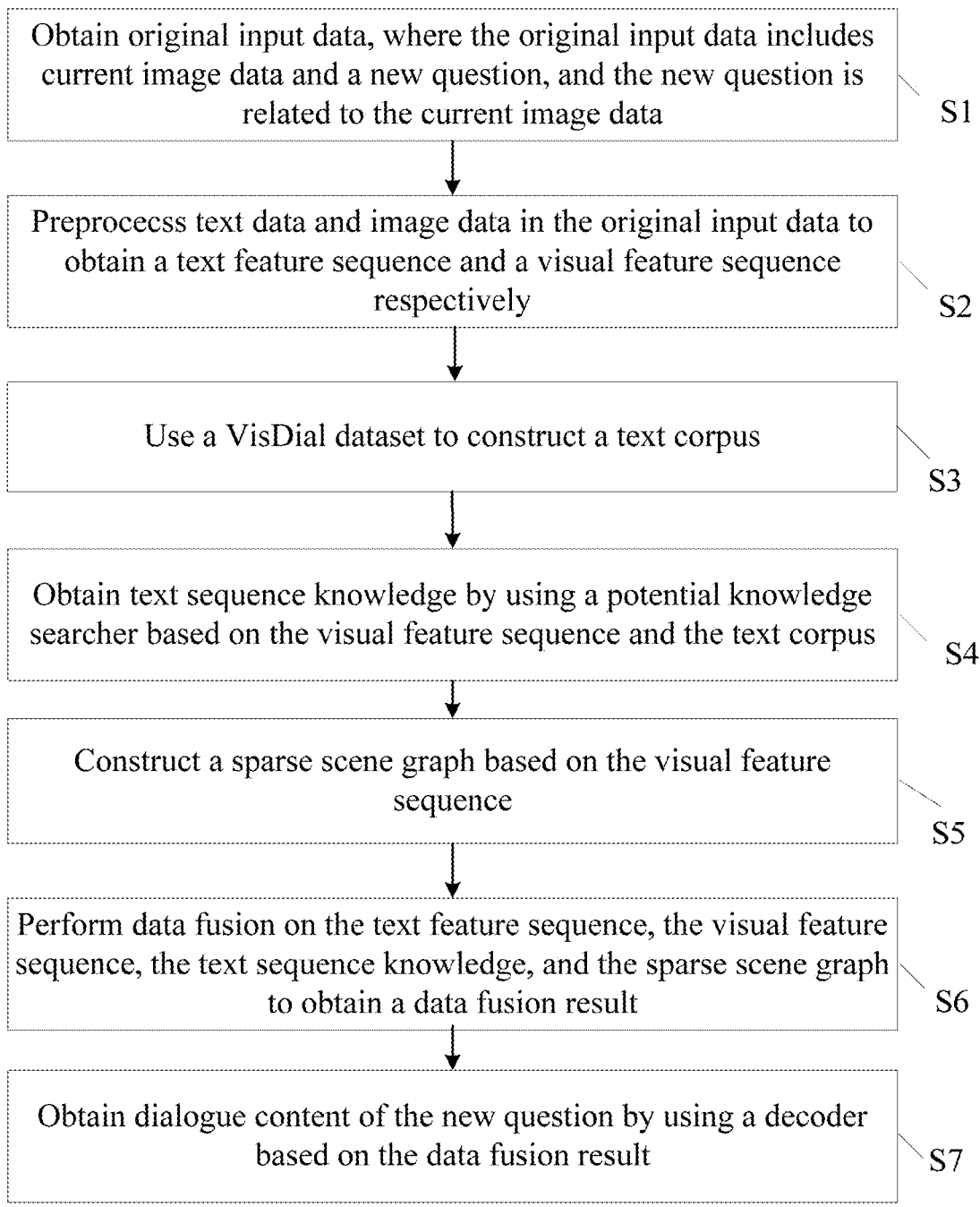
FIG. 1 is a flowchart of a visual dialogue method according to the present disclosure.

The present disclosure provides a visual dialogue method. As shown in FIG. 1, the visual dialogue method includes the following steps.

S1: Original input data is obtained, where the original input data includes current image data and a new question, and the new question is related to the current image data.

In a visual dialogue, original input data includes current image data I and its text description C, dialogue history $H_t=\{C, (Q_1, A_1), (Q_2, A_2), \ldots, (Q_{t-1}, A_{t-1})\}$ with respect to the current image data I, and new question $Q_t$. By default, the text description C is part of the dialogue history and plays an initialization role in the first round of question answering. The visual dialogue obtains the dialogue content of the new question by sorting candidate answer $A_t$.

S2: Text data and image data in the original input data are preprocessed to obtain a text feature sequence and a visual feature sequence, respectively. Specifically including:

the text data is encoded by using a word embedding and Bi-LSTM network to obtain the text feature sequence.

Herein, each word in the new question $Q_t$ is first embedded into $\{w_1^q, w_2^q, \ldots, w_L^q\}$ by using a pre-trained global vector (GloVe) model, where L represents a total quantity of words in the new question $Q_t$. Then, the embedded word feature of each word is input into a Bi-LSTM network, and a feature of a last hidden layer is selected as a sentence-level question feature $q_t$. In addition, the dialogue history $H_t$ and the candidate answer $A_t$ are also encoded by using the GloVe model and different Bi-LSTM networks to generate historical feature h and candidate answer feature $a_t$.

The image data is encoded by using faster R-CNN to obtain the visual feature sequence.

Herein, a faster R-CNN model obtained through pre-training on a Visual Genome dataset is used to extract an object-level feature of image data I and encode the object-level feature as visual feature sequence $V=\{V_1, V_2, \ldots, V_n\}$ where n represents a quantity of objects detected in each image.

S3: A text corpus is constructed by using a VisDial dataset.

The VisDial dataset is a frequently used technical means in the art. Therefore, it is also common in the art to use the VisDial dataset to construct the text corpus. Details are not specifically described in the present disclosure.

S4: Text sequence knowledge is obtained by using a potential knowledge searcher based on the visual feature sequence and the text corpus.

Optionally, the potential knowledge searcher includes an aggregation operation unit, a Bi-LSTM unit, and a similarity calculation unit. The aggregation operation unit is configured to obtain the visual feature sequence, the Bi-LSTM unit is configured to obtain text data in the text corpus, and the similarity calculation unit is configured to calculate a similarity between the text data and the visual data to obtain the text sequence knowledge.

The potential knowledge searcher aims to find Top-K sentences most similar to the current image data from the corpus S. These sentences are considered potential sequence knowledge. It is worth noting that the corpus is composed of a text description of each image in a most popular visual dialogue dataset VisDial v1.0, which contains 12.3K sentences in total. In addition, it is verified through subsequent experiments that an optimal effect can be achieved by setting K to 10. More specifically, the searcher uses a global representation of the image and a sentence in the corpus to complete a search.

Furthermore, each sentence in the corpus S is embedded in the same way as the new question. Then, a dot-product is calculated between attention features and L2 normalization to aggregate text embeddings as a single vector that is used as a global text representation.

After obtaining the object-level feature V of the image I by using the faster RCNN, the present disclosure performs an aggregation operation to form an enhanced visual global representation. In order to find the Top-K sentences that approximate most to the image from the corpus, dot-product results of global representations of the Top-K sentences are used for measuring similarities between the Top-K sentences. Then, the potential searcher uses the similarities to sort the sentences in descending order to obtain Top-10 sentences that approximate most to the image, namely, $Z=\{Z_1, Z_2, \ldots, Z_{10}\}$. After that, the Top-10 sentences are embedded in the same way as the current question to generate sentence feature $z=\{z_1, z_2, \ldots, z_{10}\}$. In order to obtain more fine-grained knowledge, word-level knowledge feature $u_r^z=\{u_{r,i}^z\}_{i=1}^{N_z}$ is also generated, where r represents a total quantity of rounds of dialogue, ranging from 1 to 10. $N_z$ represents a maximum quantity of words.

Finally, sentences with high similarity are retrieved by calculating a similarity between a text global feature and a visual global feature and are taken as text sequence knowledge corresponding to the image for subsequent answer reasoning.

S5: A sparse scene graph is constructed based on the visual feature sequence.

The present disclosure generates a scene graph of the image by using Neural Motifs obtained through pre-training on the Visual Genome dataset. The scene graph is a structured representation of a semantic relationship between objects in the image. The scene graph is composed of two representations: a) set $V=\{V_1, V_2, \ldots, V_n\}$, which is an object-level representation of the image and also serves as a node of the scene graph; and b) set $R=\{r_1, r_2, \ldots, r_m\}$, which represents a binary relationship between objects and is specifically an edge of the scene graph. Each relationship $r_k$ is a triple, which is similar to $\langle V_i, rel_{i \to j}, V_j \rangle$ and consists of a start node $V_i \in V$, end node $V_j \in V$, and visual relationship $rel_{i \to j}$. The present disclosure only detects Top-M relationships of each scene graph to reduce the impact of redundant and invalid information.

S6: Data fusion is performed on the text feature sequence, the visual feature sequence, the text sequence knowledge, and the sparse scene graph to obtain a data fusion result. This step specifically includes the following steps:

A first attention result is obtained by using a question-guided first attention module based on the text feature sequence and the new question.

Specifically, sentence-level attention guidance is performed on the text feature sequence by using the new question to obtain an attention feature.

Optionally, the question feature $q_t$ can guide the attention of the retrieved sentence in the following manner:

$$\tilde{s}^z = \sum_{r=1}^{10} \alpha_r^z z_r$$

where $\tilde{s}^z$ represents the attention feature; $\alpha_r^z$ represents a weight coefficient, and $\alpha_r^z = \text{soft max }(W_1(f_q^z(q_t) \circ f_p^z(z_r)) + b_1)$; $W_1$ and $b_1$ represent a first learnable parameter and a first offset of a neural network respectively; $z_r$ represents a sentence feature of an $r^{th}$ round of dialogue; $f_q^z$ and $f_p^z$ represent nonlinear transformation layers; $\circ$ represents an element-wise multiplication operation; $q_t$ represents the sentence-level question feature; and r represents the quantity of rounds of dialogue.

The attention feature is filtered by using a sigmoid activation function to obtain a sentence-level sequential representation of potential knowledge.

The attention feature is filtered in the following manner by using the inherent sigmoid activation function:

$$\tilde{Z} = \text{gate}^z \circ [q_t, \tilde{s}^z]$$

where $\tilde{Z}$ represents the sentence-level sequential representation of the potential knowledge; $\text{gate}^z$ represents a gating function, and $\text{gate}^z = \sigma(W_2[q_t, \tilde{s}^z] + b_2)$; $\sigma$ represents the sigmoid activation function; $W_2$ represents a second learnable parameter; $b_2$ represents a second offset; $q_t$ represents the sentence-level question feature; and $\tilde{s}^z$ represents the attention feature.

A word-level sequential representation of the potential knowledge is obtained by calculating a dot-product of an attention feature and the sigmoid activation function based on a word-level question feature of the new question.

The first attention result is obtained based on the attention feature and the word-level sequential representation of the potential knowledge.

Optionally, a word-level sequential representation of the potential knowledge is obtained by calculating a dot-product between an attention feature and the sigmoid activation function based on a word-level question feature of the new question is implemented in the following manner:

$$e^w = \text{gate}^z \circ [u^q, \tilde{w}^z]$$

where $e^w$ represents the word-level sequential representation of the potential knowledge; $u^q$ represents the word-level question feature; $\tilde{w}^z$ represents a word-level attention feature, and $$\tilde{w}^z = \sum_{r=1}^{10} \sum_{j=1}^{n_z} \alpha_{r,j}^w w_{r,j}^z; \alpha_{r,j}^w$$

represents an attention weight coefficient, and $$\alpha_{r,j}^w = \exp(t_{r,j}^w) \Big/ \sum_{j=1}^{n_z} \exp(t_{r,j}^w),$$

where $t_{r,j}^w = f_q^w (u^q)^T f_p^w (u_{r,j}^Z)$; $f_q^w$ and $f_p^w$ represent the nonlinear transformation layers; T represents a matrix transpose operation; $u_{r,j}^Z$ represents a word-level feature of the text sequence knowledge; $w_{r,j}^Z$ represents a word embedding feature of the text feature sequence; j represents a word scalar; and r represents the quantity of rounds of dialogue.

A second attention result is obtained by using a question-guided second attention module based on the text sequence knowledge.

A method for obtaining the second attention result is similar to that for obtaining the first attention result, and details are not described herein again.

The first attention result and the second attention result are cascaded to obtain a cascading result.

A third attention result is obtained by using a knowledge-guided attention module based on the visual feature sequence and the second attention result.

After obtaining a text sequence and graphic knowledge that are related to the question, original visual features extracted by the faster RCNN still need to be further aligned. All these features should be integrated in a reasonable way to obtain a correct answer through decoding. In the present disclosure, a knowledge-guided attention mechanism is used to complete semantic alignment between an image and potential text knowledge. In addition, an attention-based fusion mechanism is also applied to effectively integrate various features.

Given the word-level potential knowledge feature $e^w$, the knowledge-guided attention mechanism is used to perform a calculation on the word-level potential knowledge feature and visual feature V to align cross-modal semantics. Specifically, the visual feature V is queried by calculating a dot-product of an attention feature and a multi-layer perceptron (MLP) based on the potential knowledge feature $e^w$ to generate the object-level feature $\tilde{V}^o$ most relevant to knowledge. A specific formula is as follows:

$$r_{i,j}^v = f_q^v(e_i^w)^T f_p^v(V_j)$$

$$\alpha_{ij}^v = \exp(r_{ij}^v) \Big/ \sum_{i=1}^{n_q} \exp(r_{ij}^v)$$

$$\tilde{V}^o = MLP\left(\left[V_j, \sum_{i=1}^{n_q} \alpha_{ij}^v e_i^w\right]\right)$$

where $f_q^v$ and $f_p^v$ represent the nonlinear transformation layers, which are used to embed representations from different modalities into the same embedding space; $r_{i,j}^v$ represents a correlation coefficient matrix; $e_i^w$ represents a potential text knowledge feature output by a text sequence knowledge module; $V_j$ represents an object feature in an input image; and $n_q$ represents a maximum quantity of words in the text sequence.

In existing methods, all features are directly connected to form a joint representation to infer an answer, which often leads to inefficient interaction. The present disclosure adopts a soft attention mechanism to generate the graph knowledge feature $\tilde{V}^o$. In this way, attention can be paid to the question, a historical dialogue, text knowledge, and other valid information. Finally, all the features are further fused and input to an answer decoder to infer a final answer.

Graph convolution is performed on the sparse scene graph to obtain a graph convolution result.

Specifically, given the object feature $V_i$, neighborhood feature $V_j$ ($0 \leq j \leq m$; m represents a quantity of neighbor nodes of the object $V_i$), and their relationship feature $rel_{i \to j}$, the module first fuses the neighborhood feature and the relationship feature as relationship content of the object $V_i$. The formula is as follows:

$$\alpha_{ij} = \text{soft max}(W_3[V_j, rel_{i \to j}] + b_3)$$

$$\tilde{v}_i = \sum_{j=1}^{m} \alpha_{ij} V_j$$

Then, a gate mechanism is used to fuse the original object feature $v_i$ and its relationship content $\tilde{v}_i$, and details are as follows:

$$gate_i^v = \sigma(W_4[V_i, \tilde{v}_i] + b_4)$$

$$\tilde{v}_i^g = W_5(gate_i^v \circ [V_i, \tilde{v}_i]) + b_5$$

Where $\tilde{v}_i^g$ represents an updated scene graph representation; $\alpha_{ij}$ represents the weight coefficient; $W_i$ and $b_i$ represent learnable parameter and offset, with different values, wherein i=1~5; and $gate_i^v$ represents the gating function.

The data fusion result is obtained by using an attention-based fusion module based on the cascading result, the third attention result, and the graph convolution result.

S7: A new question's correct answer is obtained using a decoder based on the data fusion result.

100 candidate answers are represented as $a_t = \{a_1, a_2, \ldots, a_{100}\}$. A discriminant decoder performs a dot-product operation between $a_t$ and an output feature of an encoder. Then a softmax operation is performed to generate a categorical distribution of the candidate answers. Finally, optimization is performed by minimizing a multi-classification cross entropy loss function between one-hot encoding label vector y and the categorical distribution p. A specific formula is as follows:

$$L_D = -\sum_{i=1}^{100} y_i \log p_i$$

Multi-task learning: There is also a decoder called a generative decoder in a visual dialogue model. In this decoder, an output of the encoder is fed to an LSTM network to predict an answer sequence. The decoder performs optimization by minimizing a negative logarithmic likelihood of a real answer label. The formula is as follows:

$$L_G = -\sum_{i=1}^{n_a} \log p_i$$

The multi-task learning combines discriminant and generative decoders. During training, loss functions of the discriminant and generative decoders are added, namely:

$$L_M = L_D + L_G$$

The answer decoder used in the present disclosure is the above multi-task learning mode.

Figure 2:
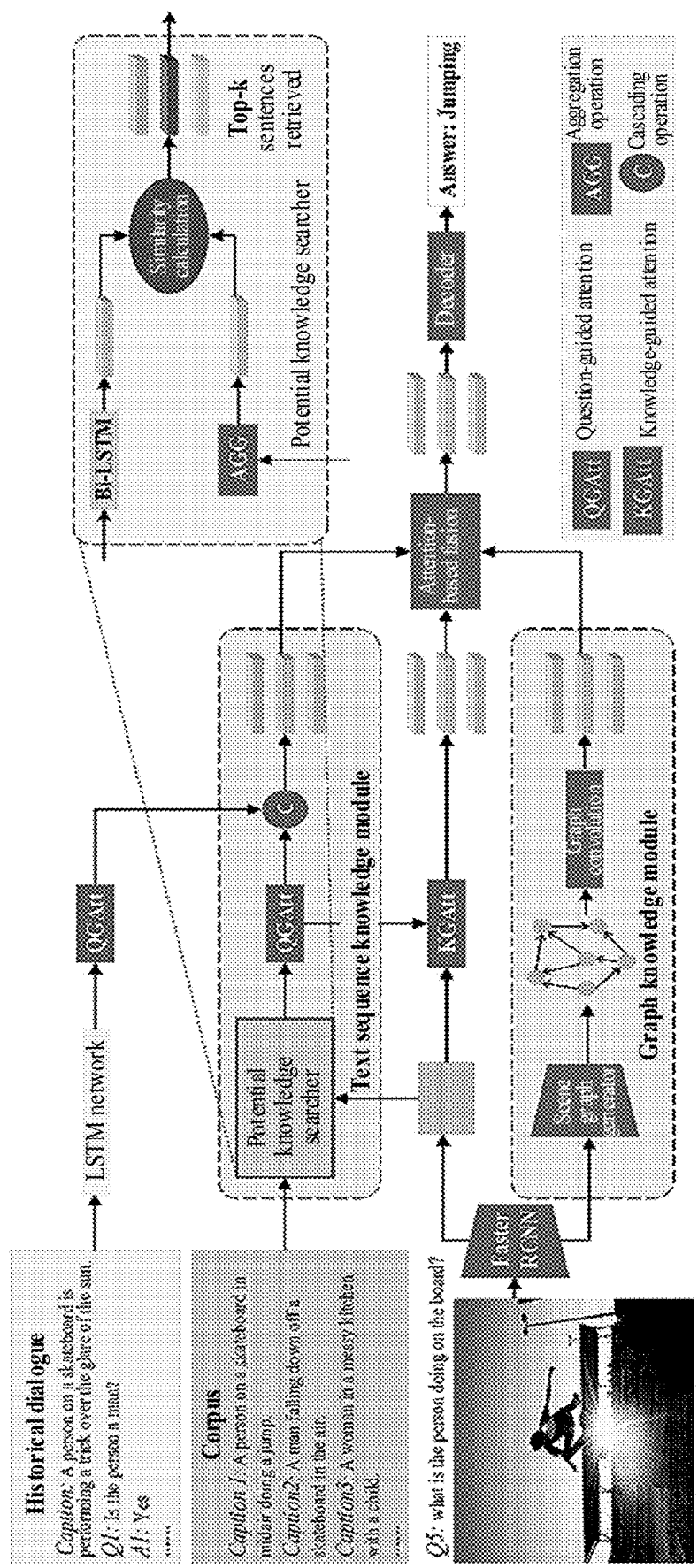
FIG. 2 is a schematic structural diagram of a visual dialogue system according to the present disclosure.

The present disclosure further provides a visual dialogue system. As shown in FIG. 2, the visual dialogue system includes:
a data obtaining module configured to obtain input data;
a word embedding and Bi-LSTM network configured to encode text data in the original input data to obtain a text feature sequence;
a faster RCNN module configured to encode image data in the original input data to obtain a visual feature sequence;
a corpus construction module configured to construct a text corpus based on a VisDial dataset;
a potential knowledge searcher configured to obtain text sequence knowledge based on the visual feature sequence and the text corpus;
a scene graph generator configured to construct a sparse scene graph based on the visual feature sequence;
a data fusion subsystem configured to perform data fusion on the text feature sequence, the visual feature sequence, the text sequence knowledge, and the sparse scene graph to obtain a data fusion result; and
a decoder configured to obtain dialogue content of a new question based on the data fusion result.

Optionally, the data fusion subsystem includes:
a question-guided first attention module configured to obtain a first attention result based on the text feature sequence and the new question;
a question-guided second attention module configured to obtain a second attention result based on the text sequence knowledge;
a cascading module configured to cascade the first attention result and the second attention result to obtain a cascading result;
a knowledge-guided attention module configured to obtain a third attention result based on the visual feature sequence and the second attention result;
a graph convolution module configured to perform graph convolution on the sparse scene graph to obtain a graph convolution result; and
an attention-based fusion module configured to obtain the data fusion result based on the cascading result, the third attention result, and the graph convolution result.

Optionally, the potential knowledge searcher includes an aggregation operation unit, a Bi-LSTM unit, and a similarity calculation unit. The aggregation operation unit is configured to obtain the visual feature sequence, the Bi-LSTM unit is configured to obtain text data in the text corpus, and the similarity calculation unit is configured to calculate a similarity between the text data and the visual data to obtain the text sequence knowledge.

The foregoing are merely descriptions of preferred embodiments of the present disclosure and are not intended to limit the present disclosure. Any modifications, equivalent replacements, and improvements made within the spirit and principle of the present disclosure should be included in the protection scope of the present disclosure.

What is claimed is:
1. A visual dialogue method, comprising:
obtaining original input data, wherein the original input data comprises current image data and a new question, and the new question is related to the current image data;
preprocessing text data and image data in the original input data to obtain a text feature sequence and a visual feature sequence, respectively;
using a Visual Dialog (VisDial) dataset to construct a text corpus;
obtaining text sequence knowledge based on the visual feature sequence and the text corpus;
constructing a sparse scene graph based on the visual feature sequence;

performing a data fusion on the text feature sequence, the visual feature sequence, the text sequence knowledge, and the sparse scene graph to obtain a data fusion result; and obtaining dialogue content of the new question by decoding based on the data fusion result;

obtaining a text data feature in the text corpus;

calculating a similarity between the text data feature and the visual feature sequence to obtain the text sequence knowledge;

wherein the step of performing the data fusion on the text feature sequence, the visual feature sequence, the text sequence knowledge, and the sparse scene graph to obtain the data fusion result comprises:

obtaining a first attention result based on the text feature sequence and the new question;

obtaining a second attention result based on the text sequence knowledge;

cascading the first attention result and the second attention result to obtain a cascading result;

obtaining a third attention result based on the visual feature sequence and the second attention result;

performing a graph convolution on the sparse scene graph to obtain a graph convolution result; and obtaining the data fusion result based on the cascading result, the third attention result, and the graph convolution result;

wherein the step of obtaining the first attention result based on the text feature sequence and the new question comprises:

performing a sentence-level attention guidance on the text feature sequence by using the new question to obtain an attention feature;

filtering the attention feature by using a sigmoid activation function to obtain a sentence-level sequential representation of potential knowledge;

obtaining a word-level sequential representation of the potential knowledge by calculating a dot-product of the attention feature and the sigmoid activation function based on a word-level question feature of the new question; and obtaining the first attention result based on the attention feature and the word-level sequential representation of the potential knowledge.

2. The visual dialogue method according to claim 1, wherein the step of preprocessing the text data and the image data in the original input data to obtain the text feature sequence and the visual feature sequence, respectively, comprises:

encoding the text data by using a word embedding method and a bidirectional long-short memory (Bi-LSTM) network to obtain the text feature sequence; and encoding the image data by using a faster region-based convolutional neural network (R-CNN) to obtain the visual feature sequence.

3. The visual dialogue method according to claim 1, wherein the step of performing the sentence-level attention guidance on the text feature sequence by using the new question to obtain the attention feature is implemented by:

$$\tilde{s}^z = \sum_{r=1}^{10} \alpha_r^z z_r$$

wherein $\tilde{s}^z$ represents the attention feature; $\alpha_r^z$ represents a weight coefficient, and $\alpha_r^z = \text{soft max}(W_1(f_q^z(q_t) \circ f_p^z(z_r)) + b_1)$; $z_r$ represents a sentence feature of an $r^{th}$ round of a dialogue; $W_1$ represents a first learnable parameter; $b_1$ represents a first offset; $f_q^z$ and $f_p^z$ represent nonlinear transformation layers; $\circ$ represents an element-wise multiplication operation; $q_t$ represents a sentence-level question feature; and $r$ represents a quantity of rounds of the dialogue; and the step of filtering the attention feature by using the sigmoid activation function is implemented by:

$$\tilde{Z} = \text{gate}^z \circ [q_t, \tilde{s}^z]$$

wherein $\tilde{Z}$ represents the sentence-level sequential representation of the potential knowledge; $\text{gate}^z$ represents a gating function, and $\text{gate}^z = \sigma(W_2[q_t, \tilde{s}^z] + b_2)$; $\sigma$ represents the sigmoid activation function; $W_2$ represents a second learnable parameter; $b_2$ represents a second offset; and $q_t$ represents the sentence-level question feature.

4. The visual dialogue method according to claim 1, wherein the step of obtaining the word-level sequential representation of the potential knowledge by calculating the dot-product of the attention feature and the sigmoid activation function based on the word-level question feature of the new question is implemented by:

$$e^w = \text{gate}^z \circ [u^q, \tilde{w}^z]$$

wherein $e^w$ represents the word-level sequential representation of the potential knowledge; $u^q$ represents the word-level question feature; $\tilde{w}^z$ represents a word-level attention feature, and $$\tilde{w}^z = \sum_{r=1}^{10} \sum_{j=1}^{n_z} \alpha_{r,j}^w w_{r,j}^z; \alpha_{r,j}^w$$

represents an attention weight coefficient, and $$\alpha_{r,j}^w = \exp(t_{r,j}^w) \bigg/ \sum_{j=1}^{n_z} \exp(t_{r,j}^w),$$

wherein $t_{r,j}^w = f_q^w(u^q)^T f_p^w(u_{r,j}^Z)$; $f_q^w$ and $f_p^w$ represent nonlinear transformation layers; T represents a matrix transpose operation; $u_{r,j}^Z$ represents a word-level feature of the text sequence knowledge; $w_{r,j}^Z$ represents a word embedding feature of the text feature sequence; j represents a word scalar; and r represents a quantity of rounds of a dialogue.

* * * * *